(12) United States Patent
Tonks et al.

(10) Patent No.: US 8,282,342 B2
(45) Date of Patent: Oct. 9, 2012

(54) VANE

(75) Inventors: Robert C Tonks, Bridgwater (GB);
Christopher Avenell, Bristol (GB);
Craig A Town, Trowbridge (GB);
Joseph B Cooper, Brize Norton (GB);
Andrew J Rose, Bristol (GB)

(73) Assignee: Rolls-Royce PLC, London (GB)

( * ) Notice: Subject to any disclaimer, the term of this patent is extended or adjusted under 35 U.S.C. 154(b) by 374 days.

(21) Appl. No.: 12/693,869

(22) Filed: Jan. 26, 2010

(65) Prior Publication Data

US 2010/0209239 A1 Aug. 19, 2010

(30) Foreign Application Priority Data

Feb. 16, 2009 (GB) .................................. 0902577.6

(51) Int. Cl.
*F04D 31/00* (2006.01)
(52) U.S. Cl. ......................................... 415/116; 416/95
(58) Field of Classification Search .................. 415/116; 416/93 R, 95, 96 R, 97 R
See application file for complete search history.

(56) References Cited

U.S. PATENT DOCUMENTS

| 4,321,007 A | * | 3/1982 | Dennison et al. | ............. 415/142 |
| 4,565,490 A |   | 1/1986 | Rice |  |
| 4,666,368 A | * | 5/1987 | Hook et al. | ................... 415/115 |

FOREIGN PATENT DOCUMENTS

| EP | 0 974 733 A2 | 1/2000 |
| EP | 1 808 574 A2 | 7/2007 |
| GB | 1 489 098 A | 10/1977 |

OTHER PUBLICATIONS

Jul. 28, 2009 Search Report issued in British Patent Application No. GB0902577.6.

* cited by examiner

*Primary Examiner* — Dwayne J White
(74) *Attorney, Agent, or Firm* — Oliff & Berridge, PLC

(57) ABSTRACT

A vane for a duct, such as an exit guide vane for an exhaust duct of a gas turbine engine, includes a vane plate, an interior strut and an internal wall disposed between the vane plate and the strut. The vane further includes a fluid inlet in the form of a scoop arranged to direct bypass fluid from outside the duct into a gap between the vane plate and the internal wall.

5 Claims, 2 Drawing Sheets

VANE

The present invention relates to a vane and is concerned particularly, although not exclusively, with a vane for an exhaust duct of an engine, such as an aircraft engine.

In the exhaust duct of a gas turbine engine a plurality of vanes or struts are attached to the duct casing and extend between walls of the duct, to support the duct and to maintain its shape. These so-called "exit guide vanes" are disposed in the path of hot exhaust gases from the engine and so are prone to becoming very hot themselves. To combat the effects of overheating, the vane is designed as a hollow structure which allows the flow of cooling air in its interior. The cooling air may be supplied at relatively high pressure from the compressor of the engine, or may be bypass air which is drawn into the vane from outside the exhaust duct, and which is at a relatively low pressure. The cooling air is directed into the interior of the vane and ultimately exits the interior via one or more exit apertures or, in the case of high pressure compressor air, via holes in the vane surface, to join the core flow—so called "film cooling".

Whereas the high pressure drop between the compressor supply and the coolant exit makes for very effective cooling in vanes which are actively cooled in this way, vanes which are cooled with scooped bypass air, at lower pressure, are less effectively cooled. The reason that so-called scoop-fed vanes in the prior art have been less effectively cooled is that the flow of cooling air is relatively low and little or no attempt has been made to control the internal flow path. The pressure drop available cannot guarantee that the cooling air will change direction sufficiently to flow along the internal surfaces of the vane. Accordingly, there are areas of the vane that are not cooled, or are cooled insufficiently. This can lead to uneven thermal expansion of certain parts and possibly overheating of the internal load bearing structure, by heat convection and radiation.

The relatively low pressure drop in scoop-fed vanes is also insufficient to allow the use of film cooling on the hot external surface of the vane.

Accordingly, embodiments of the present invention aim to provide a vane in which at least some of the aforementioned problems are at least partially overcome.

The present invention is defined in the attached independent claim to which reference should now be made. Further, preferred features may be found in the subclaims appended thereto.

According to one aspect of the present invention there is provided a vane for a duct, wherein the vane comprises a vane plate, an interior strut and an internal plate disposed therebetween, and wherein the vane further comprises a fluid inlet arranged in use to direct fluid from outside the duct into an interior of the vane.

A preferred embodiment of the present invention will now be described by way of example only with reference to the accompanying drawings in which.

Figure 1:
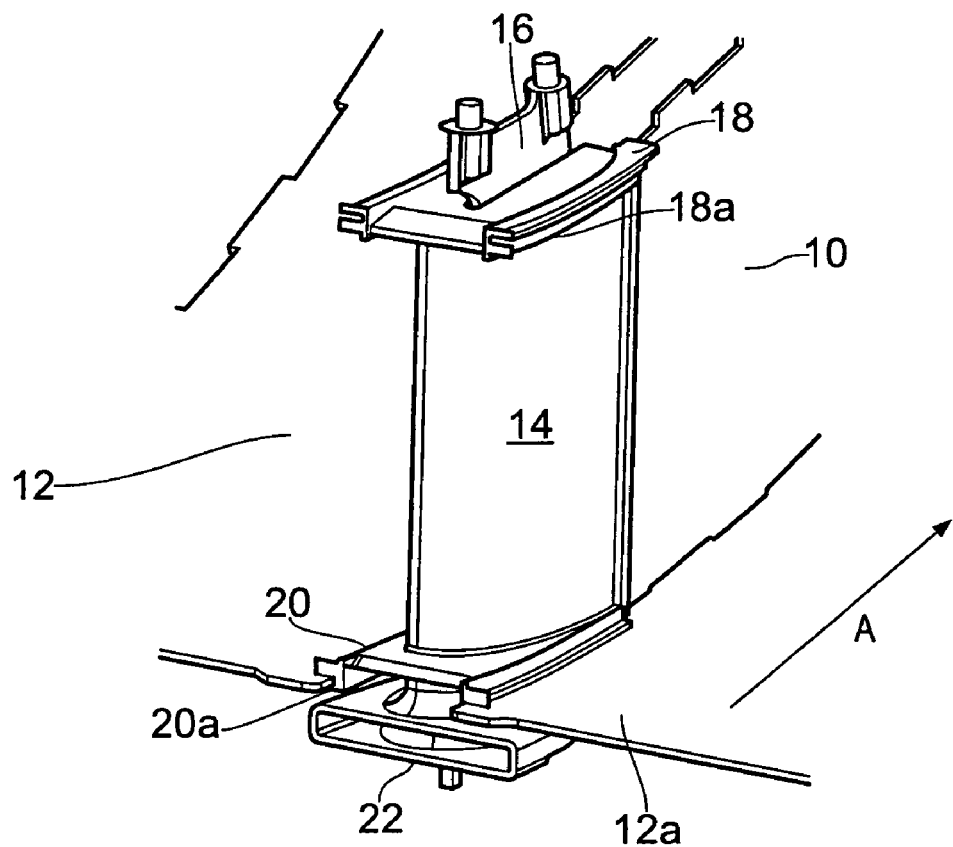
FIG. 1 shows in front perspective view a vane according to an embodiment of the present invention.

Turning to FIG. 1 this shows generally at 10 an exit guide vane mounted in an exhaust duct 12 of a gas turbine engine (not shown). The vane 10 comprises a vane plate 14 and a shear web 16 within the plate 14 acting as a strut, the ends of which are secured to the exhaust duct casing, and which extends across the entire width of the exhaust duct 12. The purpose of the web 16 is to support the duct and maintain its shape, preventing the walls of the duct from moving relative to each other.

It is to be noted that in the diagram of FIG. 1 an upper wall of the duct is omitted for reasons of clarity, whilst a lower wall 12a of the duct is shown. In use, the hot exhaust gases from the engine travel in a direction indicated by arrow A. Upper and lower mounting grommets 18 and 20 support the vane plate 14 and are located in apertures in the upper and lower duct walls respectively (only the lower of which is shown). In each case the duct wall locates in a slot 18a and 20a of the respective grommet. The positions of the grommets ensure that the vane is accurately located in the exhaust duct. The vane plate 14 may be held only by a loose friction fit in each of the grommets so that it can "float" relative to the web—ie it can expand thermally in the core flow of hot exhaust gases which thermal expansion is not restricted by the web 16 or the duct walls.

An additional benefit of this floating vane plate design is that it can be manufactured more rapidly as fitting constraints may be relaxed. The purpose of allowing the vane to float is primarily to reduce strain building in the vane. This applies both to the vane plate itself and also to the structure to which the grommets are secured. This allows the duct casing and supporting structure to undergo a level of thermal growth, twist or warp whilst maintaining the vane-cooling functionality and the associated protection of the shear web 16. The extent to which the vane can expand thermally is limited only by the depth of the grommet and the length of the vane plate, although if a large expansion range is required the vane plate can be fixed at one end—ie in respect of one of the grommets—to prevent it from becoming detached from the grommet. The system works for both radial and lateral growth and can be applied to circular or to rectangular ducts.

Integrated within the lower grommet 20 is an air inlet in the form of a scoop 22, positioned below the duct wall 12a, arranged to direct cooling air to the interior of the vane plate 14 for the purpose of cooling both the vane plate 14 and the shear web 16, as will be described in more detail below. The scoop 22 draws in so-called bypass air from the exterior of the exhaust duct.

Figure 2:
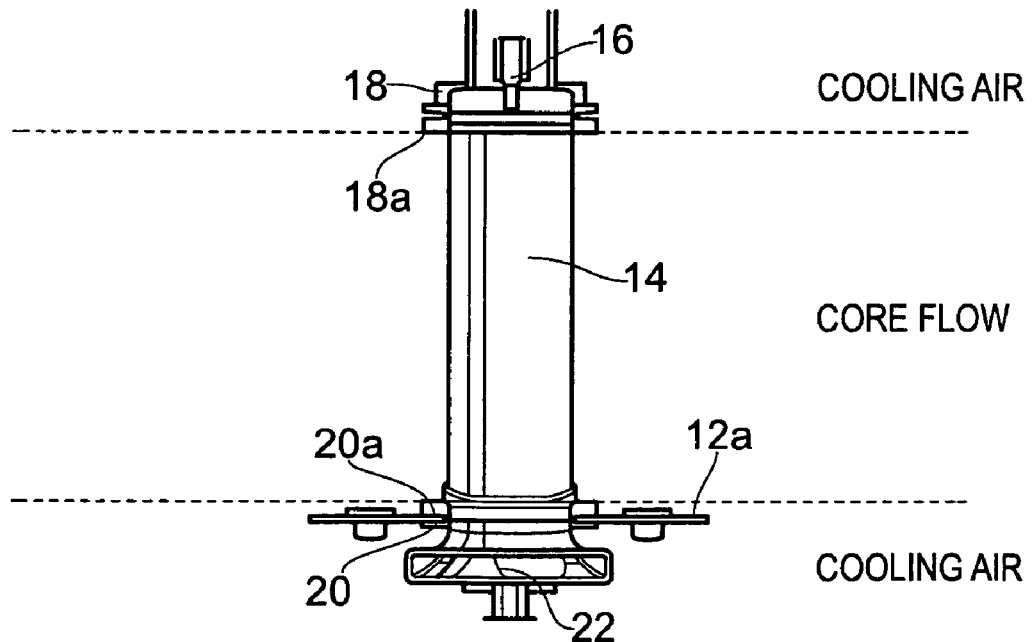
FIG. 2 shows the vane of FIG. 1 in front view.

FIG. 2 shows the vane of FIG. 1 in front view with the broken lines indicating the separation between the cooling bypass air and hot core flow.

Figure 3:
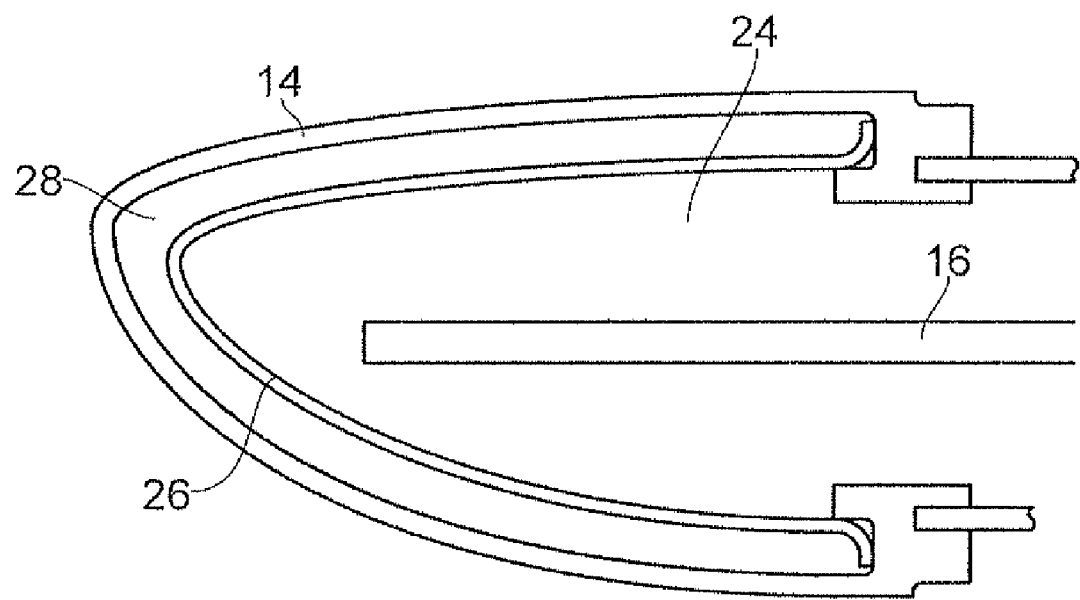
FIG. 3 is a schematic plan view of part of the vane of FIGS. 1 and 2.

Turning to FIG. 3, this shows schematically a plan of the vane of FIGS. 1 and 2 with the grommets and duct walls removed for clarity.

The vane plate 14 defines a cavity 24 within which the structural shear web 16 extends between upper and lower duct walls. Between the plate 14 and the web 16 is located an internal cooling member in the form of a wall 26 which is of substantially the same vertical length as the plate 14. A gap 28 between the vane plate 14 and internal wall 26 is arranged to receive cooling bypass air from the scoop 22 as will be described below with reference to FIG. 4.

Figure 4:
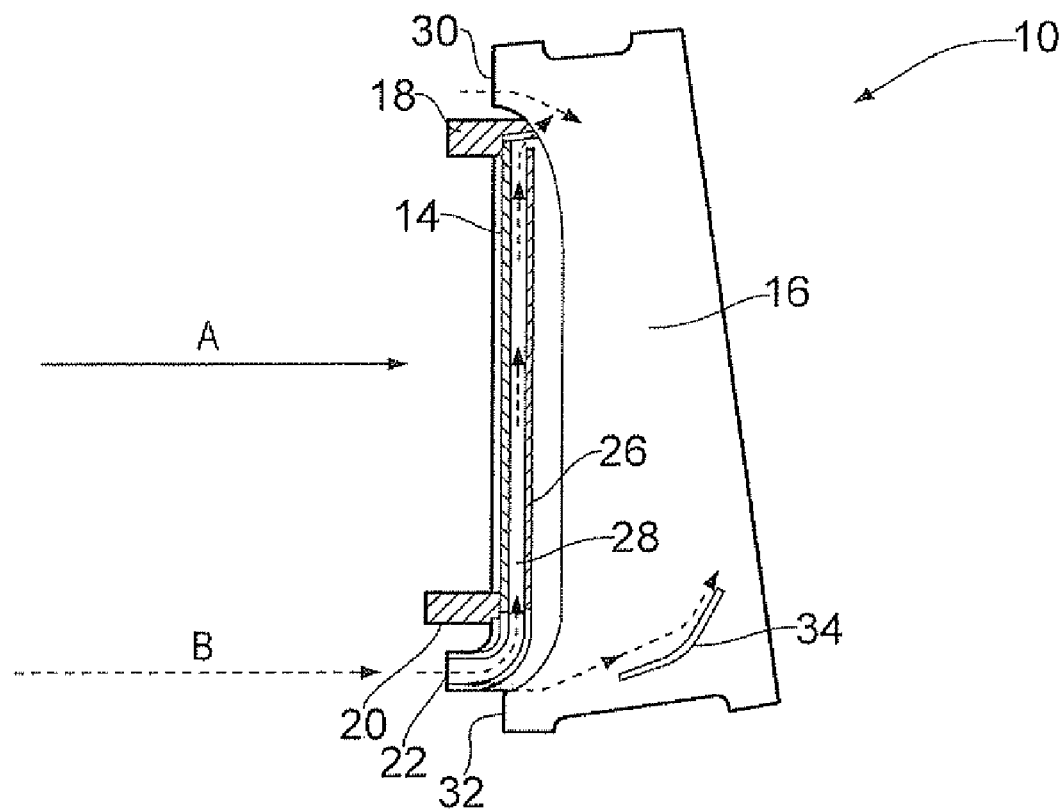
FIG. 4 is a part-sectional view of the vane of FIGS. 1 to 3.

FIG. 4 is a part sectional view of the vane assembly viewed from the side, with the direction of flow of exhaust gases being depicted by arrow A and that of bypass air by arrow B (broken lines).

As can be seen from FIG. 4 the cooling bypass air enters the interior of the vane 10 through the scoop 22 and is directed upwards into the gap 28 between the vane plate 14 and the internal wall 26 by the internal surfaces of the scoop 22. The cooling bypass air cools the interior wall 26 which helps to prevent overheating of the web 16 by radiation from the hot vane plate 16 in use. The directed bypass air also cools the interior surfaces of the vane plate itself. Cooling air also enters the cavity 24 behind the vane plates 14 at upper 30, and lower, 32 locations and a surface of a second scoop, or baffle, 34 is utilised to encourage the cooling flow to pass over the shear web 16 to help maintain a low temperature.

The above mentioned embodiment has a number of advantages when compared with previously considered vanes. Firstly, the arrangement of a floating vane plate allows the vane plate to be thermally unconstrained so that a coating can be applied to it if necessary. In addition this allows the duct casing to move without affecting the functionality of the cooling system.

The scoop 22, being an integral part of the lower grommet, helps to reduce the number of castings and parts within the assembly. This also helps to reduce the possibility of leakage of air from joints. A secondary air scoop directs flow over the shear web to maximise the cooling of the structure, and the internal cooled wall 26 constrains flow from the integrated scoop 22 into the interior passage 28, conformal to the inner surface of the vane which increases coolant velocity, and therefore raises convective heat transfer rates.

Channeling the cooling air between the vane plate 14 and the shear web 16 allows for both of these parts to be cooled simultaneously. The location and fit are ensured by the support panels and there is no requirement for permanent fastenings.

The above described invention may be utilised on any static or rotating structure which is held within a main engine gas path, such as turbine and compressor stators and turbine and compressor vanes. It may be adapted to a contained structure such as a whole tube or vane with a scoop at one end as well as leading edges. It may be used in the main combustor or reheat system for flame gutters, support structures, airspray stems and heads, combustor can supports and igniters, IGVs, OGVs and NGVs. It may be of use in recuperated designs and heat exchangers.

The present invention can also be used in cases where heating is required rather than cooling such as the de-icing of intake struts, in which case the scooped air is warmer than the core flow.

The system effectiveness can be enhanced by combining with other heat transfer methods such as aerodynamic ribs, pillows, impingement cooling or by introducing additional shell and scoop structures to achieve triple (or even higher order) layered cooling. This could also take the form of single or multi-pass cooling. Flow scoops may be arranged at the top and also the bottom of the vane. Flow in the walled passage between the vane plate 14 and the internal wall 26 may be bled from any location, or from multiple locations or even may comprise a perforated system for evenness of distribution.

The vane and grommet design may be split in a number of different ways to allow for thermal expansion. Additional features can be added to reduce flow leakage where higher pressure differences are present.

Alternative approaches may be used to allow for relative movement between the upper and lower surfaces such as flexible joints or components, expansion joints in the vane plate alone, or allow for the relative movement elsewhere in the surrounding structure such as the casing or liner.

The invention claimed is:

1. A vane for a duct, the vane comprising:
a vane plate;
an interior strut;
an internal wall disposed between the vane plate and the strut; and
a fluid inlet comprising a scoop arranged in use to direct bypass fluid from outside the duct into a gap between the vane plate and the internal wall.

2. The vane of claim 1, wherein the vane plate is supported within the duct by at least one grommet.

3. The vane of claim 2, wherein the fluid inlet is formed integrally with the grommet.

4. The vane of claim 1, further comprising at least one further fluid inlet arranged in use to direct fluid from outside the duct into the interior of the vane.

5. The vane of claim 4, further comprising a baffle, disposed within the vane, arranged in use to direct fluid from the at least one further fluid inlet onto the interior strut.

* * * * *